United States Patent Office 3,454,479
Patented July 8, 1969

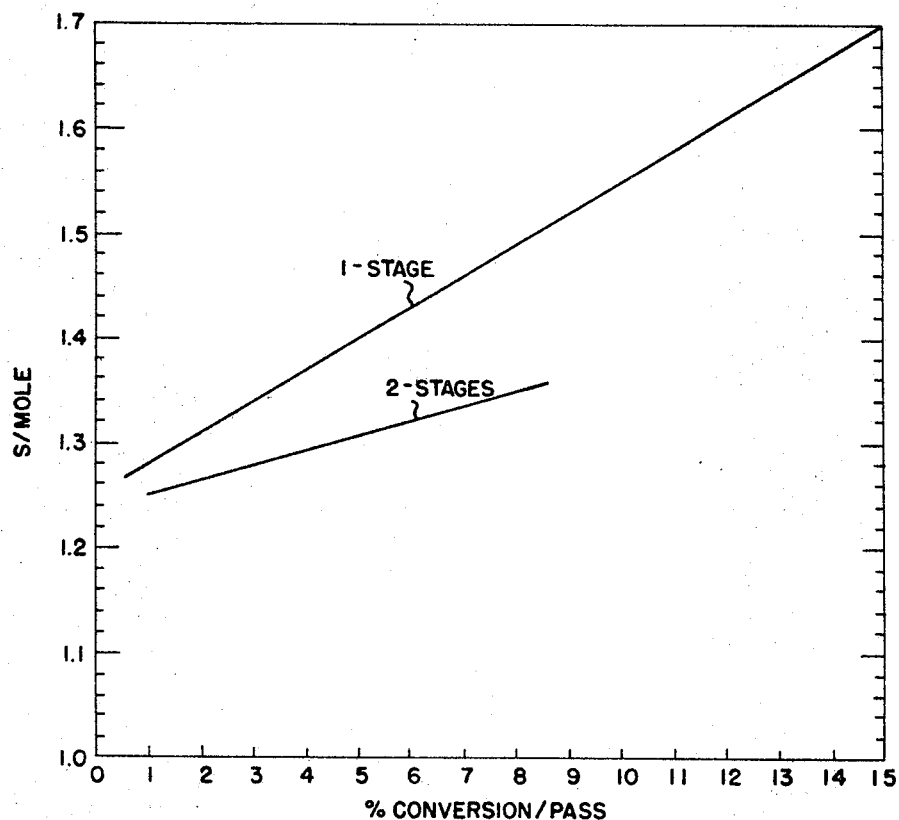

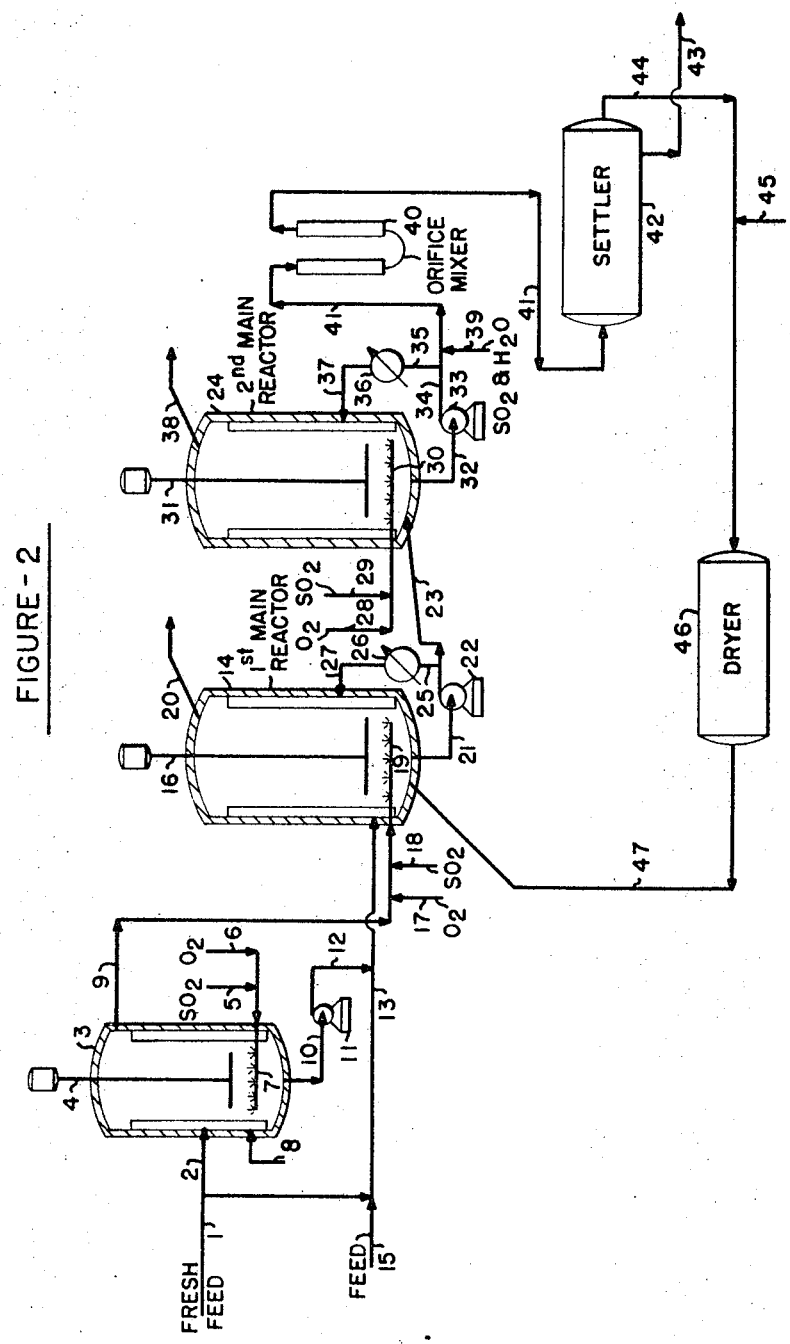

3,454,479
PROCESS FOR IMPROVED SULFOXIDATION PRODUCTS
Don J. Hopkins, Rahway, William J. Munley, Jr., North Plainfield, and John Mackinnon, Iselin, N.J., assignors to Esso Research and Engineering Company, a corporation of Delaware
Filed Dec. 1, 1964, Ser. No. 414,965
Int. Cl. C07c *143/00;* B01j *1/10*
U.S. Cl. 204—158          11 Claims

ABSTRACT OF THE DISCLOSURE

Detergent intermediates having optimum sulfur levels are prepared by the persulfonic acid promoted sulfoxidation of $C_{10}$–$C_{30}$ paraffins in two or more well-mixed stages, preferably two stages, operated under conditions to obtain overall conversion of 2–9%, preferably 3–7% of product sulfonic acids.

---

The present invention relates to a process for preparing improved sulfoxidation products for detergents. More particularly this invention relates to a continuous process for preparing an optimum (as to detergency and as to biodegradability) mixture of mono- and polysulfonic acids having critical low sulfur per mole ratios of preferably 1.25:1 to 1.35:1. Yet more particularly this invention relates to an improved chemically initiated or preferably high energy radiation initiated continuous process in which said optimum mole ratio is obtained by carrying out the reaction in two or more well mixed stages, preferably two stages operated to obtain low overall (total for both stages) conversions. Most particularly, in a preferred embodiment, this invention relates to an improved continuous process for also handling contaminants introduced with the feed or in recycle streams. This is accomplished by utilizing a seed reactor from which a small portion of a vigorously reacting sulfoxidation reaction mixture containing persulfonic acids is continuously supplied with the feed streams to the first stage of the process whereby the persulfonic acids immediately react with the contaminants to thereby prevent these contaminants from partially quenching and reducing conversions. By employing this seed reactor technique uniform conversions and product are continuously maintained.

Various processes have been described in the prior art for sulfoxidizing $C_{10}$–$C_{30}$ paraffins to obtain the corresponding valuable sulfonic acids for detergents. However, most of these processes including the German processes developed during the war and described in Angew. Chem. 62, 302–5 (1950) suffered from large requirements for UV or chemical initiators and other disadvantages. Recently it was discovered that these disadvantages could be overcome by using gamma radiation to obtain a fully self-sustaining reaction. This process is described in U.S. Ser. No. 118,221, filed May 15, 1961 now abandoned. It has now been discovered that a particularly economic process for obtaining excellent product for detergents may be obtained utilizing either gamma radiation or particular chemical initiators, by carrying out the reaction continuously in two or more stages operated under critical reaction conditions to obtain overall conversions of 2–9%, preferably 3–7%. Thus, it has now been found that a sulfur per mole ratio of 1.2–1.5:1, preferably 1.25–1.35:1, is optimum and that this mole ratio is obtainable economically in a continuous process only by both carrying out the reaction in two or more stages and utilizing specific low overall conversions. The following data show the critical effect of sulfur per mole ratio on detergency and on biodegradability.

DETERGENCY
[Simulated Dishwashing Test [1]]

| S/Mole | Water Hardness | |
|---|---|---|
| | 2 grains/gal. | 15 grains/gal. |
| 1.2 | 20 | 20 |
| 1.31 | 19 | 20 |
| 1.32 | 20 | 21 |
| 1.35 | 20 | 21 |
| 1.62 | 15 | 13 |

[1] Number of dishes added one at a time until disappearance of foam. Dishes coated with oil and washed in 0.03 wt. percent solution of $C_{16}$ sodium alkane sulfonate. (No builders added. Prepared by radiosulfoxidation.)

Biodegradability (Laboratory test [1])

COD (Chemical Oxygen Demand)

| S/Mole: | Mg. $O_2$/L. |
|---|---|
| 1.0 | 10 |
| 1.6 | 33 |
| 2.2 | 33 |

[1] Solutions containing 37.5 mg./l. of $C_{16}$ sodium alkane sulfonate from radiosulfoxidation and fortified with standard essential mineral nutrient salts were innoculated with sewage bacteria and maintained at ambient temperature with stirring for 20 days.

[2] Samples withdrawn after 20 days tested by titration with dichromic acid to determine chemical oxygen required to convert undegraded organic material to $CO_2$ and $H_2O$. For comparison an 80 mg./l. glucose solution (concentration for approximately same theoretical oxygen demand) after 20 days had a COD of 6 mg. $O_2$/l.

Referring to the accompanying drawings, in FIGURE 1 the sulfur per mole levels obtained utilizing two stages vs. utilizing 1 stage in a continuous process at various total conversions are compared. As can be seen, in the one stage continuous process, sulfur per mole ratios below about 1.35:1 cannot be produced at practical conversion levels, i.e., above about 3% (at 3% conversion the amount of uncovered material to be separated, recycled and reactor required, is uneconomically large, viz., 32 times the amount of material actually reacted vs. e.g., 19 times at 5% conversion).

It has also now been discovered that particular efficiencies can be obtained by utilizing a small separate seed reactor to continuously initiate and maintain the reaction in the first stage reactor. Thus, gamma radiation or less preferably a chemical initiator is continuously supplied to the seed reactor to obtain a vigourously reacting sulfoxidation mixture and a small portion of this mixture (containing persulfonic acids which kindle the sulfoxidation reaction and react with impurities to remove them) is supplied with the paraffin feed to the first stage reactor. This embodiment provides both (1) a large saving in radiation or initiator (compared to supplying these to the first stage reactor) and (2) removal of impurities present in more economic feeds containing somewhat higher levels of impurities or positive assurance against occasional impurities in the feed tending to quench the reaction in the first stage reactor.

The present invention will be more clearly understood from a consideration of the accompanying drawing, FIGURE 2, describing a preferred method of carrying out the invention. Refering to the drawing, fresh feed is supplied through line 1 and valved line 2 to seed reactor 3 containing a stirrer 4. This reactor is preferably irradiated with gamma radiation, and gaseous $SO_2$ and oxygen are supplied respectively through lines 5 and 6 and gas frit 7 into the bottom of the reactor. Alternatively to gamma radiation, a chemical initiator, e.g., lauroyl peroxide may be supplied to the reactor through line 8. From the upper part of the reaction zone spent residual $SO_2$ and oxygen gases are vented through line 9. When the sulfoxidation reaction becomes self-sustaining a part of the reaction mixture is continually removed through line 10 and is passed through pump 11, line 12 and line 13 to the first stage main reactor 14. Cooling coils not shown may be utilized in the seed reactor to remove the heat of reaction or a pump-around cooling system (as in the main reactors) may be used.

Alternatively, if a seed reactor is not used feed is passed from line 1 through line 13 to the first stage reactor 14, and radiation or chemical initiation is supplied to the first stage reactor in a manner similar to that described with respect to the seed reactor. If a seed reactor is used part of the feed is supplied to the seed reactor as previously described and the remainder is passed through line 1 and line 13 to the first stage reactor 14 (no radiation or chemical initiation required in reactor 14). It should be noted that the same feed or a different feed than that supplied to the first stage reactor may be used for the seed reactor. In the latter embodiment the feed for the first stage main reactor would be supplied through line 15 to line 13. Reactor 14 is also equipped with a stirrer 16 and gaseous oxygen and $SO_2$ are supplied through lines 17 and 18 respectively (along with spent gases from the seed reactor supplied through line 9 if a seed reactor is used) to gas frit 19 located in the bottom of the reactor 14. Spent gases are vented through line 20 and product is withdrawn through line 21, passed through pump 22 and through line 23 to the second stage main reactor 14. Additionally, if desired, a cooling stream is recycled to the reactor through line 25, cooler 26 and line 27. Gaseous $SO_2$ and oxygen are supplied to the second stage reactor 24 through lines 29 and 28 respectively. Additionally spent gases may be supplied, if desired from line 20. The combined gas stream is supplied to a gas frit 30 located in the bottom of the reactor 24. The reactor is equipped with a stirrer 31 and product is continually withdrawn through line 32 to pump 33 and line 34. From line 34 a cooling stream may be recycled to the reactor through line 35, cooler 36 and line 37. Spent $SO_2$ and $O_2$ are vented from the reactor through line 38. $SO_2$ and water are added to line 34 through line 39 to quench the reaction, and the product stream is passed through orifice mixer 40 and line 41 to settler 42 where a water phase is separated from the oil phase. The water phase is passed on to product recovery (neutralization, deoiling, desalting, evaporation, drying, etc.) through line 43 and the oil phase is passed through line 44 with additional oil recovered from the aqueous layer in later processing not shown supplied through line 45. The combined stream is passed through dryer 46 and line 47 back to the first stage main reactor 14. It should be noted that the amount of oil recycled is very large compared to the amount of fresh oil supplied to the first stage reactor (and to the seed reactor if a seed reactor is used).

Preferred feeds and reaction conditions to be used in carrying out the present invention are as follows:

Feeds

The preferred hydrocarbon feeds for use in the present invention comprise $C_{10}$ to $C_{30}$ saturated straight chain paraffins such as n-dodecane, n-pentadecane, n-octadecane, n-eicosane or n-docosane. Because large quantities of pure normal alkanes are not economically available, it is desirable to utilize petroleum feeds containing also some branched chain paraffins and other impurities. Feeds containing tertiary carbon atoms are objectionable unless the reaction is in a self-sustained state. Thus, when the words "substantially straight chain" are hereinafter used to describe preferred feeds, they are intended to mean that the feed comprises substances that are substantially free of compounds containing such carbon atoms, i.e., contain less than 10 mole percent, preferably less than 5 mole percent more preferably less than 2 mole percent, of such compounds. The feeds may also contain small amounts of monoolefins such as 1-dodecene, octadecene, etc.; but the amounts of these materials also should be limited to less than 10 mole percent, preferably less than 5 mole percent, more preferably less than 2 mole percent.

The hydrocarbon feed (and recycle hydrocarbon stream) and oxygen and sulfur dioxide reactants are preferably substantially anhydrous. However, small amounts of water can be tolerated. Preferably the total amount of water in all the feed streams should be less than 500 p.p.m., more preferably less than 200 p.p.m. The $SO_2$ and $O_2$ reactants are generally introduced into the reaction zone in the form of essentially pure chemicals. Sometimes, particularly in the case of oxygen, an inert diluent, such as nitrogen, may be employed. For example, dry air can be utilized as a source of molecular oxygen for the reaction. Other substances that contain free oxygen or are capable of producing oxygen under the reaction conditions can also be used in the process. In starting up the reaction the organic feed is generally introduced in the reaction zone first, followed by the inorganic reactants which are usually bubbled through the feed. The molar ratio of $SO_2$ to molecular oxygen in the reaction zone is preferably about 3 to 15:1, more preferably 5 to 10:1. In order to avoid discoloration while the mixture is in the reaction zone the molar ratio should be at least 2:1. If desired, large excesses of sulfur dioxide can be employed, e.g., molar ratios greater than 10:1, but this is usually unnecessary to obtain a substantially colorless product.

The quantity of sulfur dioxide and oxygen used in carrying out the reaction is in the range of 0.013:1 to 0.130:1, preferably 0.04:1 to 0.08:1 mole ratio of oxygen to hydrocarbon feed and in the range of 0.04:1 to 1.95:1, preferably 0.20:1 to 0.80:1 molar range of $SO_2$ to hydrocarbon feed. It should be noted that these ratios to a large extent control the conversions obtained in the reaction. In addition to the reactants recited, diluents may be used such as $CCl_4$ and $CHCl_3$ but these are not preferred.

Initiators

The preferred initiator is high energy ionizing radiation having an energy of over 30 electron volts. This ionizing radiation can be obtained from X-ray and beta ray machines; from waste materials from nuclear reactors, such as spent fuel elements or portions thereof; from neutron reactors; and from artifically produced isotopes, such as Cobalt 60. The reaction mixture can be exposed to the radiation in a straightforward manner continuously in a suitable container or conduit. When using a radioisotope, the reactants can be flowed in, or around the isotope in a plurality of streams. A suitable Cobalt 60 gamma radiation source has been described by J. F. Black et al. in the "International Journal of Applied Radiation and Isotopes," volume I, page 256 (1957). It is preferred to use electromagnetic radiation having a wave length in the range of $10^{-3}$ to $10^2$ A.

Neutron radiation will give the same basic reaction as electromagnetic radiation. A process based upon the use of neutron radiation is not, however, as desirable, as it produces from the sulfur atom, radioactive species of appreciable half-lifes.

The use of beta radiation from Van de Graaf generators or similar machines is also less desirable as it leads to a high local concentration of heat. Further, it has been found that the reaction has a half-order dependency on dose rate, such that excessively high dose rates result in a poor utilization of the radiant energy. Such sources that give a localized high input can be used, somewhat inefficiently, to start the reaction if proper care is used.

Gamma radiation from radioactive materials so arranged as to avoid high dose rates is preferred and may be conveniently employed. The preferred amount of radiation supplied where a seed reactor is used is that amount to obtain absorption by the material in the reactor of $1 \times 10^3$ to $1 \times 10^7$, preferably $1 \times 10^4$ to $1 \times 10^6$ roentgens/hour. (Where no seed reactor is used the amount of radiation supplied to the first stage reactor is that amount to obtain absorption by the material in the first stage main reactor of $1 \times 10^3$ to $1 \times 10^7$, preferably $1 \times 10^4$ to $1 \times 10^6$ roentgens/hour.)

*Chemical initiators*

In general, any chemical initiator may be used that does not react with $SO_2$ or oxygen directly. Preferably, chemical initiators should be used that decompose below about 200° F. Especially preferred chemical initiators are diacyl peroxides, e.g., lauroyl peroxides and benzoyl peroxide; azo compounds, e.g., azo bis isobutyronitrile; peroxides, e.g. tertiary buty perbenzoate; and lead tetraacetate.

The amount of initiator supplied to the seed reactor is 0.00375 to 0.375, preferably 0.0375 to 0.225 pound per gallon of hydrocarbon and in the first stage reactor where no seed reactor is used 0.00375 to 0.375, preferably 0.0375 to 0.225 pound per gallon of hydrocarbon. The chemical initiator is preferably supplied in a hydrocarbon stream heated to a temperature above that of the reactor, preferably 100 to 200° F., more preferably 130 to 170° F. A higher temperature is desirable to increase the rate of decomposition of the initiator.

*Reaction conditions (each stage and seed reactor)*

(A) Temperatures: Preferably 90–150° F., more preferably 100–120° F.

(B) Pressures: 0–1000 p.s.i.g., preferably 0–100 p.s.i.g., more preferably 45 to 80 p.s.i.g.

(C) Residence Time: 0.1–100 minutes, preferably 1–60 minutes, more preferably 5–40 minutes.

(D) Conversion: 2–7%, preferably 3–6%, more preferably 4–5%. The first stage reaction is carried out to a hydrocarbon conversion to sulfonic acids of at least 1%. These conversions are obtained by appropriately combining the above variables, e.g., low temperature, longer residence time, etc.

(E) Seed Reactor: Where a seed reactor is used, the amount of product from the seed reactor supplied to the first stage reactor is 0.001 to 0.10, preferably 0.01 to 0.05 pound of seed reactor effluent per pound of fresh feed hydrocarbon and recycle hydrocarbon supplied.

The present invention will be more clearly understood from a consideration of the following examples which present laboratory and pilot plant data.

EXAMPLE 1

Experiments were conducted in a small two-stage laboratory reactor. The reactor had an inside diameter of 3 inches and each of the stages was stirred with a 2 inch outside diameter turbine. The temperatures and pressures in both stages of the reactor were approximately 100 to 115° F., and 70 to 75 p.s.i.g. in Runs 1 through 8 and approximately 120 to 125° F. and 90 p.s.i.g. in Runs 9 through 14. The first stage of the reactor was continuously irradiated with gamma radiation from a Cobalt 60 source at an estimated dose rate of 4.0 to $4.5 \times 10^5$ roentgens/hour (at the center line of the reactor; calculated assuming attenuation due only to distance). The volume of reactor liquid in each stage was approximately equal. A description of the workup of the product and calculations regarding sulfur per mole and conversion is presented in Example 1A following.

TWO-STAGE SULFOXIDATION EXPERIMENTS

| Run | Feed | S/Mole[a] | Conv.,[b] percent | Paraffin Rate, cc./min. | $SO_2$ Rate, cc./min. (liq.) | 1st Stage $O_2$,[c] cc./min. gas | 2d Stage $O_2$,[c] cc./min. (gas) |
|---|---|---|---|---|---|---|---|
| 1 | ASTM Cetane | 1.32 | 4.8 | 77 | 6.3 | 250 | 170 |
| 2 | do | 1.27 | 3.2 | 78 | 6.3 | 170 | 120 |
| 3 | do | 1.34 | 4.2 | 79 | 6.3 | 170 | 210 |
| 4 | $C_{14.5}$[d] | 1.31 | 5.42 | 73 | 6.8 | 245 | 245 |
| 5 | $C_{14.5}$[d] | 1.28 | 5.1 | 78 | 5.9 | 205 | 140 |
| 6 | ASTM Cetane | 1.47 | 5.6 | 49 | 6.9 | 140 | 140 |
| 7 | do | 1.35 | 4.7 | 48 | 7.3 | 85 | 130 |
| 8 | do | 1.38 | 4.8 | 48 | 7.3 | 85 | 130 |
| 9 | $C_{13}$[d] | 1.25 | 3.0 | 79 | 7.3 | 122 | 122 |
| 10 | $C_{13}$[d] | 1.25 | 2.4 | 79 | 7.3 | 122 | 122 |
| 11 | $C_{14}$[d] | 1.29 | 2.5 | 77 | 7.3 | 122 | 122 |
| 12 | $C_{14}$[d] | 1.23 | 2.1 | 78 | 7.3 | 145 | 122 |
| 13 | $C_{14.9}$[d] | 1.24 | 1.7 | 79 | 7.3 | 145 | 122 |
| 14 | $C_{15}$[d] | 1.32 | 1.8 | 77 | 7.3 | 135 | 122 |

[a] Calculated from percent S and percent C analysis.
[b] Based on hydrocarbon fed and product recovered.
[c] At 70° F. and 1 atm.
[d] Narrow cut normal paraffins from mol. sieve process.

EXAMPLE 1A.—ONE STAGE SULFOXIDATION EXPERIMENTS

Experiments were conducted in a small laboratory stirred continuous reactor to determine the effect of conversion upon sulfur/mole levels of the product sodium alkane sulfonates. The stirred reactor was continuously irradiated with gamma radiation from a cobalt 60 source at an estimated dose rate of $4.6 \times 10^5$ R/hr. and temperature and pressure were maintained at 105° F. and 45 p.s.i.g. respectively. In each of the runs the hydrocarbon feed was a blend of equal parts by weight of Humphrey Wilkinson ASTM n-$C_{16}$, n-$C_{18}$ and n-$C_{20}$ paraffins (resulting blend is n-$C_{17.85}$ and is free of $SO_2$, $CH_3OH$, $H_2O$ and sulfonic acids). The liquid hydrocarbon feed was continuously supplied to the reactor at a rate of 10 cc./minute, 230 cc. (at 1 atm. and 80° F.) per minute of gaseous $O_2$ and varying amounts of gaseous $SO_2$ (indicated in the table below as ratio $SO_2/O_2$) were continuously bubbled into the liquid, and a portion of the reactor liquid contents was continuously withdrawn, the liquid residence time being 35 minutes. The product continuously withdrawn was quenched under pressure with water and samples were collected over varying periods of 0.75 to 2 hours. Two phases separated and an aliquot portion of the acid phase was freed of $SO_2$, neutralized with NaOH, extracted with n-heptane to remove residual hydrocarbon, evaporated to dryness, sodium sulfate remove and the weight yield of product sulfonate was determined. (This general procedure was also used in the other examples reported.) The organic sulfonate was analyzed for sulfur and in some cases for carbon. Sulfur per mole ratios were calculated as follows: (a) from S/C ratio = (wt. percent S/wt. percent C) = $(12 \times 17.85/32)$ and (b) from wt. percent S in $C_{17.85} H_{37.7-x} (SO_3Na)_x$ and solving for $x = S//$mole assuming 15% of S present as $SO_4$. Conversion, percent pass, was determined from the product yield using the empirical formula referred to in the preceding sentence for the molecular weight of the sodium sulfonate.

| Run | $SO_2:O_2$ Mol Ratio | S/Mole Via— S/C | S/Mole Via— Percent S | Conversion, pass |
|---|---|---|---|---|
| 1 | 3 | 1.44 | 1.41 | 4.2 |
| 2 | 3 | 1.39 | 1.38 | 2.9 |
| 3 | 3 | 1.36 | 1.35 | 3.9 |
| 4 | 3 | 1.33 | 1.31 | 0.9 |
| 5 | 3 | 1.31 | 1.29 | 2.4 |
| 6 | 3 | | 1.40 | 5.4 |
| 7 | 3 | | 1.40 | 3.7 |
| 8 | 3 | | 1.28 | 7.1 |
| 9 | 3 | | 1.50 | 7.8 |
| 10 | 3 | | 1.60 | 7.8 |
| 11 | 3 | | 1.47 | 7.2 |
| 12 | 3 | | 1.64 | 10.6 |
| 13 | 3 | | 1.62 | 10.6 |
| 14 | 3 | | 1.65 | 6.7 |
| 15 | 3 | | 1.43 | 2.9 |
| 16 | 5 | 1.62 | 1.60 | 13.4 |
| 17 | 5 | 1.66 | 1.60 | 13.4 |
| 18 | 5 | | 1.58 | |
| 19 | 5 | | 1.69 | 14.4 |
| 20 | 5 | | 1.73 | 9.9 |
| 21 | 5 | | 1.55 | 10.8 |
| 22 | 5 | | 1.64 | 10.8 |
| 23 | 5 | | 1.55 | 10.8 |
| 24 | 5 | | 1.61 | 14.2 |
| 25 | 5 | | 1.64 | 14.8 |
| 26 | 5 | | 1.68 | 11.8 |
| 27 | 5 | | 1.62 | 11.8 |
| 28 | 5 | | 1.61 | 14.0 |
| 29 | 5 | 1.68 | 1.62 | 11.6 |
| 30 | 5 | 1.69 | 1.62 | 13.2 |
| 31 | 5 | 1.64 | 1.59 | 13.9 |
| 32 | 5 | 1.68 | 1.60 | 14.1 |
| 33 | 5 | 1.82 | 1.78 | 15.1 |
| 34 | 5 | 1.82 | 1.85 | 11.8 |
| 35 | 5 | 1.75 | 1.61 | 14.3 |
| 36 | 5 | | 1.59 | 14.3 |
| 37 | 5 | | 1.45 | 10.1 |
| 38 | 5 | | 1.44 | 10.0 |
| 39 | 5 | 1.61 | 1.48 | 15.4 |
| 40 | 5 | 1.53 | 1.50 | 11.5 |
| 41 | 5 | | 1.47 | |
| 42 | 5 | | 1.43 | |

It is noted that the differing conversions obtained under similar reaction conditions are attributable to trace impurities in the hydrocarbon feed blend, e.g., $H_2O$, isoparaffins, cycloparaffins, olefins, aromatics, etc.

EXAMPLE 1B.—ADDITIONAL ONE-STAGE SULFOXIDATION EXPERIMENTS

Bench Unit
4″ ID Reactor
2″ OD Turbine (1,500 r.p.m.)
Temp., 110–117° F.; Pressure 73–76 p.s.i.g.

| Run | Feed | S/Mole | Conv.,[b] percent | Paraffin Rate, cc./min. | $SO_2$ Rate, cc./min. (liq.) | $O_2$ Rate, cc./min. (gas)[c] | Estimated[d] Dose Rate (R/hr.) |
|---|---|---|---|---|---|---|---|
| 1 | $C_{18}$[e] | 1.41 | 7.8 | 46 | 7.6 | 410 | 4–5×10⁵ |
| 2 | $C_{18}$[e] | 1.44 | 8.4 | 46 | 7.6 | 428 | 4–5×10⁵ |
| 3 | $C_{18}$[e] | 1.31 | 5.5 | 79 | 7.6 | 410 | 4–5×10⁵ |
| | Chemically Initiated | | | | | | |
| 4 | ASTM Cetane | 1.49 | 12.2 | 36 | 7.5 | 500 | None.[f] |
| 5 | $C_{14.5}$[e] | 1.69 | 15.0 | 25 | 7.5 | 500 | Do.[f] |
| 6 | ASTM Cetane | 1.39 | 10.2 | 30 | 7.5 | 530 | Do.[f] |

[a] Calculated from percent S and percent C analysis.
[b] Based on hydrocarbon fed and product recovered.
[c] At 70° F. and 1 atm.
[d] At the centerline of the reactor assuming attenuation due only to distance.
[e] Narrow cut normal paraffins from mol. sieve process.
[f] 3 wt. percent lauroyl peroxide added to 600 cc. paraffin in reactor at beginning of run.

EXAMPLE 2.—TWO-STAGE SULFOXIDATION PILOT PLANT RUNS

10″ ID—5 Gal. Reactor
6″ OD—Turbine (Two)

| Runs | 1 | 2 | 3 | 4 | 5 | 6 | 7 | 8 | 9 | 10 | 11 |
|---|---|---|---|---|---|---|---|---|---|---|---|
| Feed C-No.[1] | 14.2 | 14.2 | 15.8 | 15.8 | 15.8 | 15.8 | 18.0 | 18.0 | 18.0 | 18.0 | 18.0 |
| S/Mole | 1.34 | 1.27 | 1.27 | 1.24 | 1.32 | 1.35 | 1.32 | 1.28 | 1.30 | 1.29 | 1.29 |
| Conversion,[2] percent | 6.5 | 4.9 | 4.2 | 5.1 | 4.6 | 3.5 | 4.9 | 4.6 | 4.0 | 4.3 | 4.3 |
| Total Paraffin Rate (#/hr.) | 52 | 52 | 82 | 86 | 86 | 88 | 63 | 66 | 66 | 66 | 66 |
| Make-Up Paraffin[3] Rate (#/hr.) | | | | 9.4 | 8.2 | 10.0 | 6.4 | 5.4 | 5.4 | 3.2 | 5.6 |
| Recycle[4] $SO_2$ (#/hr.) | 4.1 | 4.2 | 4.3 | 4.3 | 3.0 | 3.2 | 3.2 | 3.2 | 3.2 | 3.2 | 3.2 |
| Make-Up[5] $SO_2$ (#/hr.) | 5.7 | 5.7 | 12.4 | | 12.9 | 12.5 | 6.5 | 8.7 | 8.7 | 5.7 | 6.4 |
| 1st Stage $O_2$ (s.c.f.h.) | 5.3 | 5.3 | 5.5 | 4.6 | 4.6 | 4.4 | 3.0 | 3.0 | 3.0 | 3.0 | 3.0 |
| 2d Stage $O_2$ (s.c.f.h.) | 5.3 | 5.3 | 4.9 | 4.8 | 4.8 | 4.4 | 2.9 | 2.9 | 2.9 | 2.9 | 2.9 |
| Estimated[6] Dose Rate (R/hr.) | 1.7×10⁵ | [7] None | 1.7×10⁵ | 1.7×10⁵ | 1.7×10⁵ | 1.7×10⁵ | [8] None | [8] None | [8] None | [8] None | [8] None |

[1] Mole average carbon number feed from mol. sieve process.
[2] Based on hydrocarbon and product recovered from sample of reactor effluent.
[3] May contain some recycled hydrocarbon.
[4] Calculated from $SO_2$ solubility in recycle paraffin.
[5] Total to both stages; approx. equal amounts supplied to each stage.
[6] Calculated assuming attenuation due to distance only; calculated at reactor centerline of pilot reactor.
[7] Run 1 made by cutting off the radiation after self-sustaining reaction was obtained.
[8] Runs 7–11 made using irradiated seed reactor and un-irradiated pilot reactor; approx. 4 wt. percent of total hydrocarbon supplied to 1st stage is continuously reacted with $SO_2$ and $O_2$ in an irradiated (8.7 × 10⁵ R/hr., as in footnote 6) seed reactor under similar conditions and product passed to 1st stage reactor.

The results obtained in Examples 1, 1A, 1B, and 2 are compared in the accompanying drawing, FIGURE 1. The curves are drawn based on a statistical least mean squares plot of all the data. As can be seen optimum sulfur per mole ratios are obtained in the two stage continuous process at conversions of 3–8% and that these results represent a large improvement over the results obtained in the one-stage operation.

It is to be understood that this invention is not limited to the specific examples, which have been offered merely as illustrations, and that modifications may be made without departing from the spirit of this invention.

What is claimed is:

1. A process for preparing sulfonic acids which comprises continuously supplying reagents consisting essentially of oxygen, $SO_2$, and a substantially straight chain $C_{10}$–$C_{30}$ saturated hydrocarbon feed containing less than 10 mol percent of molecules containing tertiary carbon atoms and less than 10 mol percent monoolefins to a first stage stirred reactor, reacting said materials at temperatures of 90–150° F. in the presence of persulfonic acids, to a hydrocarbon conversion to sulfonic acids of at least 1%, continuously withdrawing from said first stage reactor a portion of the reaction mixture and supplying said withdrawn reaction mixture to a second stage stirred reactor, supplying $SO_2$ and oxygen to said second stage reactor, reacting said materials at a temperature of 90–150° F., continuously withdrawing a portion of the reaction mixture from the said second stage reactor after a residence time in both reactors to obtain conversions to sulfonic acids of 2–9%, quenching and reducing the withdrawn mixture with an aqeuous reducing agent and recovering sulfonic acids from said quenched mixture.

2. The process of claim 1 in which the total amount of water present in the feed, $SO_2$ and $O_2$ streams is less than 500 p.p.m.

3. The process of claim 1 in which pressures in both reactors are selected within the range of 0 to 1000 p.s.i.g. so that the $SO_2$ concentration in the liquid is greater than 1 wt. percent.

4. The process of claim 1 in which high energy ionizing radiation is continuously supplied to the first stage reactor.

5. The process of claim 1 in which persulfonic acids are continuously supplied to the first stage reactor from a seed reactor operated at temperatures of 90 to 150° F., the said seed reactor being continuously supplied with $C_{10}$–$C_{30}$ substantially straight chain paraffinic feed, oxygen, $SO_2$ and high energy ionizing radiation and product containing persulfonic acids being continuously withdrawn and supplied to the said first stage reactor, residence times in the seed reactor being selected to obtain conversions of 0.5 to 10.0%.

6. The process of claim 5 in which the amount of product continuously supplied to the first stage reactor is 0.001 to 0.10 pounds per pound of total hydrocarbon feed supplied to the first stage reactor.

7. The process of claim 1 in which persulfonic acids are continuously supplied to the first stage reactor from a seed reactor operated at temperatures of 90 to 150° F., the said seed reactor being continuously supplied with $C_{10}$–$C_{30}$ substantially straight chain paraffinic feed, oxygen, $SO_2$ and a chemical initiator and product containing persulfonic acids being continuously withdrawn, residence times in the seed reactor being selected to obtain hydrocarbon conversions of 0.5 to 10.0%.

8. The process of claim 7 in which the amount of chemical initiator continuously supplied to the seed reactor is 0.1 to 3 wt. percent based on hydrocarbon feed and the reactor is operated at temperautres of 120 to 150° F.

9. The process of claim 7 in which the chemical initiator is supplied in admixture with the hydrocarbon feed at temperatures of 130 to 170° F., the amount of said initiator being 0.5 to 3 wt. percent based on hydrocarbon feed.

10. The process of claim 1 in which hydrocarbon conversion to sulfonic acids in the first stage reactor is at least 2%.

11. The process of claim 6 in which hydrocarbon conversion to sulfonic acids in the seed reactor is at least 2%.

References Cited

UNITED STATES PATENTS

| | | | |
|---|---|---|---|
| 2,503,280 | 4/1950 | Lockwood | 260—513 |
| 2,507,088 | 5/1950 | Bradley | 260—513 |
| 3,260,741 | 7/1966 | Mackinnon et al. | 260—513 |

OTHER REFERENCES

Orthner, Agnew, Chem. 62, (1950), 302–5 QD1 Z5.

DANIEL D. HORWITZ, *Primary Examiner.*

U.S. Cl. X.R.

260—513